(12) United States Patent
Hufnagel et al.

(10) Patent No.: US 11,138,067 B2
(45) Date of Patent: Oct. 5, 2021

(54) METHOD AND DEVICE FOR DETERMINING CHECK SUMS, BUFFER MEMORY AND PROCESSOR

(71) Applicant: Robert Bosch GmbH, Stuttgart (DE)

(72) Inventors: Simon Hufnagel, Herrieden (DE); Jens Gladigau, Renningen (DE); Sebastian Bolk, Warmbronn (DE)

(73) Assignee: Robert Bosch GmbH, Stuttgart (DE)

( * ) Notice: Subject to any disclaimer, the term of this patent is extended or adjusted under 35 U.S.C. 154(b) by 22 days.

(21) Appl. No.: 16/631,484

(22) PCT Filed: Jul. 13, 2018

(86) PCT No.: PCT/EP2018/069141
§ 371 (c)(1),
(2) Date: Jan. 16, 2020

(87) PCT Pub. No.: WO2019/016099
PCT Pub. Date: Jan. 24, 2019

(65) Prior Publication Data
US 2020/0210281 A1     Jul. 2, 2020

(30) Foreign Application Priority Data

Jul. 17, 2017  (DE) .................... 102017212181.5

(51) Int. Cl.
*G06F 11/10* (2006.01)
(52) U.S. Cl.
CPC ...... *G06F 11/1064* (2013.01); *G06F 11/1004* (2013.01)

(58) Field of Classification Search
CPC ............. G06F 11/1064; G06F 11/1004; G06F 12/0868; G06F 12/0804
See application file for complete search history.

(56) References Cited

U.S. PATENT DOCUMENTS

| | | | | |
|---|---|---|---|---|
| 5,233,616 | A * | 8/1993 | Callander | G06F 12/0804 711/E12.04 |
| 7,437,597 | B1 * | 10/2008 | Kruckemyer | G06F 11/1064 714/6.11 |
| 2003/0093744 | A1 * | 5/2003 | Leung | G06F 11/1048 714/763 |
| 2014/0325313 | A1 * | 10/2014 | Chan | G06F 11/1076 714/764 |

FOREIGN PATENT DOCUMENTS

| | | |
|---|---|---|
| DE | 112011100618 T5 | 3/2013 |
| EP | 2728477 A1 | 5/2014 |

OTHER PUBLICATIONS

International Search Report for PCT/EP2018/069141, dated Oct. 23, 2018.

* cited by examiner

*Primary Examiner* — Thien Nguyen
(74) *Attorney, Agent, or Firm* — Norton Rose Fulbright US LLP; Gerard Messina

(57) ABSTRACT

A method for determining check sums for a buffer memory for a processor, the method including a step of reading in a data unit of the buffer memory marked as changed by an access of the processor, a step of ascertaining a check sum for the data unit using a check sum unit of the buffer memory and a step of supplementing the data unit with the check sum and marking the data unit as changed with a valid check sum.

17 Claims, 4 Drawing Sheets

METHOD AND DEVICE FOR DETERMINING CHECK SUMS, BUFFER MEMORY AND PROCESSOR

FIELD

The present invention is directed to a device and to a method for determining checksums, a buffer memory, and a processor. The subject matter of the present invention is also a computer program.

BACKGROUND INFORMATION

Buffer memories, so-called caches, are used to reduce the access time of a processor to data stored in a memory.

SUMMARY

An example method, an example device that uses this method, an example buffer memory and an example processor and, finally, a corresponding computer program are provided. Advantageous refinements of and improvements on the example device and method are described herein.

A check sum may be advantageously directly formed within a buffer memory via a data unit stored in the buffer memory, which has been changed by an access within the buffer memory. In this way, it is possible to ensure the integrity of the data stored in the buffer memory.

A method for determining check sums for a buffer memory for a processor includes the following steps:

reading in a data unit of the buffer memory marked as changed by an access of the processor;

ascertaining a check sum for the data unit using a check sum unit of the buffer memory; and supplementing the data unit with the check sum and marking the data unit as changed with a valid check sum.

The processor may be a so-called CPU, for example, in the form of a microcontroller. The processor may be used in a vehicle, for example, in a control unit of a vehicle. The buffer memory may be a so-called cache. The buffer memory is also referred to below as a cache. The buffer memory may be distinguished by access times for read accesses and/or for write accesses by the processor, which are shorter than access times on a main memory of a memory architecture that includes the processor. The data unit may, for example, represent an entire or part of a memory line or memory column of the buffer memory. The data unit may, for example, be marked as "changed" or as "changed with a valid check sum" using a marker. A check sum may be understood to mean a value that allows the integrity of the data unit to be checked. Conventional methods may be resorted to when ascertaining the check sum. The check sum unit may be a unit integrated into the buffer memory or a device or a method for determining check sums. A data unit marked as changed may be a data unit that has been changed by a write access of the processor to the data unit. A redetermination of a check sum assigned to the data unit may be required due to such a change.

The steps of ascertaining and supplementing may be carried out within a time span that falls minimally between the access of the processor and a writing back of the data unit into a main memory. Such a time span is also referred to as cache-only time. In this way, it may be ensured that an instantaneous check sum is ascertained for the changed data unit before the data unit is written back into a main memory.

According to one specific embodiment, at least two steps of ascertaining and supplementing may be carried out within the time span. If the steps of ascertaining and supplementing are able to be carried out very quickly, it is possible to ascertain multiple check sums for multiple data units using one and the same check sum ascertainment unit. In this way, it is possible to keep the number of check sum ascertainment units to a minimum.

The method may include an additional step of reading in an additional data unit of the buffer memory marked as changed by an additional access of the processor, an additional step of ascertaining an additional check sum for the additional data unit using an additional check sum ascertainment unit of the buffer memory, and an additional step of supplementing the additional data unit with the check sum and of marking the additional data unit as changed with a valid check sum. In this way, it is possible to ascertain in parallel check sums for multiple data units. The number of check sum ascertainment units of the buffer memory in this case may correspond to a maximum number of data units, which may be changed by the processor within the cited time span.

The method may include a step of counting a number of accesses of the processor to the data unit. In this case, the step of ascertaining may be carried out as a function of the number of accesses. For example, the step of ascertaining may be carried out if the number of accesses reaches or exceeds a predetermined number. In this way, it is possible to avoid an unnecessary ascertainment of check sums if the data unit is changed multiple times in succession.

In a step of loading a data unit, the check sum of the data unit may be used to check the integrity of the data unit using the check sum unit. In this way, the data unit may be utilized twice.

This method may, for example, be implemented in software or in hardware or in a mixed form of software and hardware, for example, in a control unit.

A device for determining check sums for a buffer memory for a processor may include the following features:

a read-in unit, which is designed to read in a data unit of the buffer memory marked as changed by an access of the processor;

an ascertainment unit, which is designed to ascertain a check sum for the data unit using a check sum ascertainment unit of the buffer memory; and a supplementing unit, which is designed to supplement the data unit with the check sum and to mark it as changed with a valid check sum.

The device may be designed to carry out, activate or implement the steps of a variant of a method presented herein in corresponding units. With this embodiment variant of the present invention in the form of a device as well, it is possible to quickly and efficiently achieve the object underlying the present invention.

A buffer memory for a processor includes an aforementioned device for determining check sums for the buffer memory. Known buffer memory architectures may be advantageously supplemented with the device.

For example, the buffer memory may be designed as an integrated circuit, which includes the aforementioned device. In this way, no external interface to the device is required.

The buffer memory may include a processor interface for enabling an access of the processor to data units of the buffer memory, and a main memory interface for loading and/or writing back data units into a main memory. Thus, the buffer memory may be used for conventional memory architectures.

A processor may include a corresponding buffer memory. Very rapid access times of an arithmetic unit of the processor to the data units stored in the buffer memory result if the buffer memory is integrated into the processor.

Such a processor may include a processing unit for processing signals or data, at least the buffer memory unit for storing data and at least one communication interface for reading in or outputting data that are embedded in a communication protocol. The processor and/or the aforementioned device may include an interface, which may be designed in hardware and/or in software. In a hardware design, the interfaces may, for example, be part of a so-called ASIC system, which contains a variety of functions of the device. It is also possible, however, that the interfaces are dedicated, integrated circuits or are made up at least partly of discrete components. In a software design, the interfaces may be software modules, which are present, for example, on a microcontroller in addition to other software modules.

Also advantageous is a computer program product or computer program having program code, which may be stored on a machine-readable carrier or memory medium such as a semiconductor memory, a hard disk memory or an optical memory, and is used to carry out, implement and/or activate the steps of the method according to one of the previously described specific embodiments, in particular, if the program product or program is executed on a computer or on a device.

Exemplary embodiments of the approach presented herein are depicted in the figures and explained in greater detail below.

DETAILED DESCRIPTION OF EXAMPLE EMBODIMENTS

Figure 1:
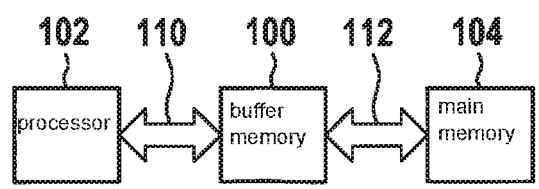
FIG. 1 shows a block diagram of a memory architecture according to one exemplary embodiment.

In the following description of preferred exemplary embodiments of the present invention, identical or similar reference numerals are used for elements which are represented in the various figures and act similarly, a repeated description of these elements being omitted.

FIG. 1 shows a block diagram of a memory architecture according to one exemplary embodiment. The memory architecture includes a buffer memory 100 in the form of a cache, a processor 102 in the form of a CPU and a main memory 104. Buffer memory 100 is connected to processor 102 via a processor interface 110 and to main memory 104 via a main memory interface 112. Processor interface 110 is secured with the aid of a check sum via a data word. Main memory interface 112 is secured with the aid of a check sum via a complete cache line.

According to one exemplary embodiment, the check sum is ascertained via a complete cache line, a so-called main memory check sum using the approach presented herein.

The memory architecture shown by way of example in FIG. 1 is distinguished by specific characteristics of the communication between components 100, 102, 104. Thus, processor interface 110 is distinguished by a short latency, for example, of a few clocks of processor 102, and the access takes place with each read instruction (load) or write instruction (store) or in each clock for loading the next instruction. The access width in this case is based on the data bus width and/or on the instruction set, for example, 32 bit data words, of processor 102. Main memory interface 112 has a high latency. An access takes place in the case of cache miss of the cache if thus data requested by processor 102 are not located in buffer memory 100 or when writing a changed cache line from buffer memory 100. The access width in this case is based on the cache line width of buffer memory 100, which may include multiple data words of processor 102 per access.

FIG. 1 shows a hierarchical memory architecture, which may be used, for example, for computationally-intensive automotive systems, for example, for driver assistance of for automated driving.

Buffer memory 100 is also referred to below as cache 100 and processor 102 is also referred to as CPU 102.

The hierarchical structure includes the, for example, DRAM-based main memory 104, which in most cases is not integrated into CPU 102, for example, a microprocessor, but is designed as an external component or components. This results in a limited bandwidth and an increased latency for the exchange of data between CPU 102 and main memory 104. In order to counter this, cache hierarchies are typically used, which buffer the data locally on the chip of processor 102. Thus, processor 102 and buffer memory 100 according to one exemplary embodiment are implemented in one and the same component, for example, in an integrated circuit.

The exchange of data between cache 100 and main memory 104 or of the caches on the next higher level takes place in this case on the basis of data units referred to as cache lines. A cache line in this case includes in most cases multiple data words or instruction words, which are able to be processed or executed in succession by CPU 102. If data are required that are not instantaneously buffered in cache 100 (cache miss), the data are downloaded automatically from the cache of the next level or from main memory 104 and other data buffered in cache 100 are overwritten. This means the data of the affected cache line are "displaced" and are available only in caches of a higher level or in main memory 104. The determination of the cache line to be displaced may take place, for example, using the least-recently-used method, in which the cache line whose last access lies furthest in the past is displaced.

One exemplary architecture of a memory hierarchy including the characteristic properties of the communication between respective components 100, 102, 104 is shown in FIG. 1.

In this case, an error detection takes place with the aid of check sums. If demands with respect to functional safety are placed on the data processing and program execution of the system, this frequently results in components 100, 102, 104 of the memory architecture being fitted with mechanisms for error detection and, if necessary, error correction. A principle frequently used for such purpose is forward error correction based on check sums. Under this principle, a data unit of defined size (for example data word or cache line) is supplemented with a check sum, which is stored in the cache or in the main memory in addition to the data word.

The respective check sum method and the size of the data units secured as a result may vary within a memory hierarchy. For example, error correction codes may be used for securing the individual 32 bit data words between CPU 102 and buffer memory 100 designed, for example, as a level 1 cache, whereas check sums may be used across entire 256 bit large cache lines for securing the data between cache 100 and main memory 104. The use of check sums across larger data units in this case results in a reduction in the portion of check bits of the overall memory requirement. When data is exchanged between components secured using different methods, an evaluation of the existing check sums as well as a recalculation (recoding) of the check sums valid for the target components will take place. The recoding, if it takes place in the critical timing path, directly impacts the system performance in a negative manner.

Caching strategies are therefore provided for data changed by CPU 102 within buffer memory 100. If a data word in a cache line is changed by the program execution, this change of the data is passed into main memory 104 for the purpose of data consistency. Different strategies are possible for such purpose:

Write-Through: in this strategy, the changed data are passed immediately to the next higher cache level or to main memory 104. If the data are required to be provided with a check sum, the calculation of the check sum also takes place immediately. Thus, the duration of the check sum calculation directly impacts the transmission of the data into the next higher cache level or to the main memory.

Write-Back: in this strategy, the changed data are passed to the next higher cache level or to main memory 104 only at a later point in time. In the meantime, the cache line affected by the change is marked as modified. The passing then takes place in one of the following situations, i.e., either when the modified data in cache 100 are displaced or when changing the affected cache line in another cache at the same level as part of the cache coherence protocol. The latter is relevant only if the memory hierarchy contains coherent caches.

The time span that a modified cache line maintains until it is displaced in cache 100 is referred to below as "cache-only" time.

The approach described herein allows for a method and a system for the cost-efficient and time-efficient calculation of main memory check sums in memory architectures having data caches 100. A cost-efficient calculation of the main memory check sums is advantageously enabled for changed data in write-back caches 100 with no additional latency. Main memory check sums in this case are check sums of entire cache lines, which are stored in the memory in addition to the content-related data.

According to one exemplary embodiment, cache 100 is also fitted with at least one or with multiple units for calculating the main memory check sums. These units carry out the calculation of the main memory check sums automatically before the modified cache line is displaced, i.e., within the cache-only time.

For this purpose, main memory 104 is advantageously not required to have explicit error detection measures at its disposal. In addition, the detection of data corruptions is enabled by elements situated on the path between cache 100 and main memory 104, such as chip-internal communication structures or memory controllers for main memory 104. Furthermore, no additional latency forms due to the calculation of the main memory check sums, since their calculation is carried out already during the cache-only time and is already present at the point in time the corresponding main memory check sum is displaced. Since the calculation of the main memory check sums does not influence the latency while the data are in the cache, the units for calculating the main memory check sums may be designed with lower throughput and, therefore, more cost-efficiently.

Figure 2:
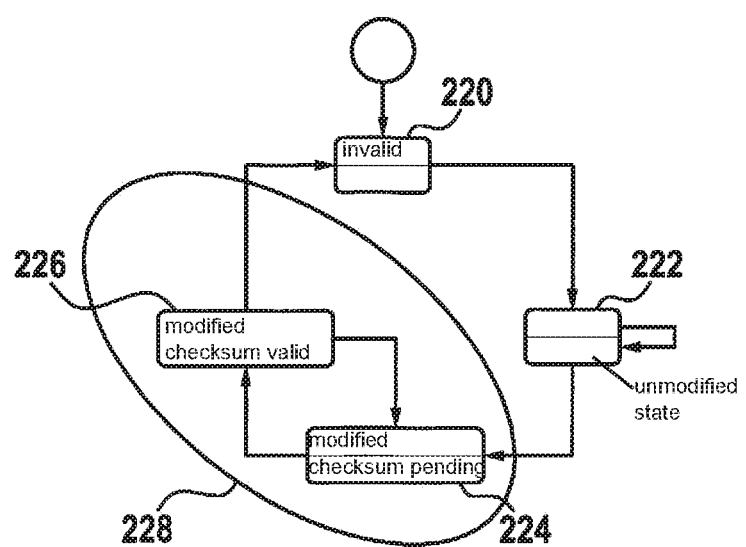
FIG. 2 shows a state diagram of a data unit according to one exemplary embodiment.

FIG. 2 shows a state diagram of a data unit, also referred to as a cache line, according to one exemplary embodiment. An invalid state 220 "invalid", an unchanged state 222 "unmodified", a changed state 224 with a check sum not yet completed "modified_checksum_pending" and a changed state 226 with a valid check sum "modified_checksum_valid" of the data unit are shown. States 224, 226 are passed through in time span 228 referred to as cache-only time.

In order to arrive at state 222 from state 220, a cache line is loaded (load cacheline). If the cache line is reloaded in state 222 (load cacheline), state 222 is maintained. By changing the cache line (modify cacheline), a switch is made from state 222 to state 224. When the ascertainment of the check sum is completed (check sum calculation finished), a switch is made from state 224 into state 226. If the cache line is changed again (modify cacheline), a switch is made from state 226 back into state 224. If on the other hand the cache line is written back (write back), a switch is made from state 226 into state 220.

In the exemplary state diagram of a cache line shown in FIG. 2, states 220, 222 "invalid" and "unmodified" correspond to the states in conventional caches. The state "modified" of a classic cache is divided here into two states 224, 226. A cache line, after it is changed by the CPU, is situated in state 224 "modified_checksum_pending", since the main memory check sum is not yet present. Once the main memory check sum has been calculated and has been stored as part of the cache line, the cache line changes to state 226 "modified_checksum_valid" and, if needed, may be written back into the main memory with no further waiting time.

The cache-only time as time span 228 between the change of the cache line and the writing back into the main memory is exclusively a function of the access behavior of the CPU and of the cache line displacement strategy in the case of a memory hierarchy without coherent caches. A lower barrier of the cache-only time may be calculated as a function of the cache line displacement strategy. In the case of the most-recently-used method, this is calculated as $$t_{cache\_only\_min\_MRU} = \eta_{clk\_per\_CPU\_access} * t_{clk\_period}$$

$\eta_{clk\_per\_CPU\_access}$: Number of clocks that are required for an access of the CPU to the respective cache $t_{clk\_period}$: Duration of a clock cycle If the least-recently-used method is used, the lower barrier of the cache-only time is calculated as $$t_{cache\_only\_min\_LRU} = \eta_{way} * \eta_{clk\_per\_CPU\_access} * t_{clk\_period}$$

$\eta_{way}$: Number of cache ways (number of cache lines that are considered for buffering a memory word)

A displacement of the affected cache line is guaranteed not to take place within the corresponding time $t_{cache\_only\_min}$ after the data are changed.

This time may be utilized in order to update the main memory check sum of the instantaneous cache line. Once a displacement of the cache line is to then take place (write-back), the main memory check sum is already present and no additional waiting time occurs.

In the case of the least-recently-used method, it should be noted that cache lines may be modified within $t_{cache\_only\_min}$ LRU up to $\eta_{way}$. Accordingly, in one exemplary embodiment $\eta_{way}$ calculation units are to be provided, which are capable of calculating the respective main memory check sum within $t_{cache\_only\_min\_LRU}$.

Alternatively, fewer calculation units having a lower calculation duration may also be used without the check sum calculation resulting in additional latency, as long as the following conditions are met:

1. $t_{checksum\_duration} \leq t_{cache\_only\_min\_LRU}$
2. $t_{checksum\_duration}/\eta_{checksum\_units} \leq t_{cache\_only\_min\_MRU}$ If the case that initially $\eta_{way}$ cache lines are modified sequentially in only one word and are subsequently displaced sequentially is sufficiently unlikely, and no guaranteed freedom of latency of the check sum calculation is required, then condition 2 may be dispensed with.

Figure 3:
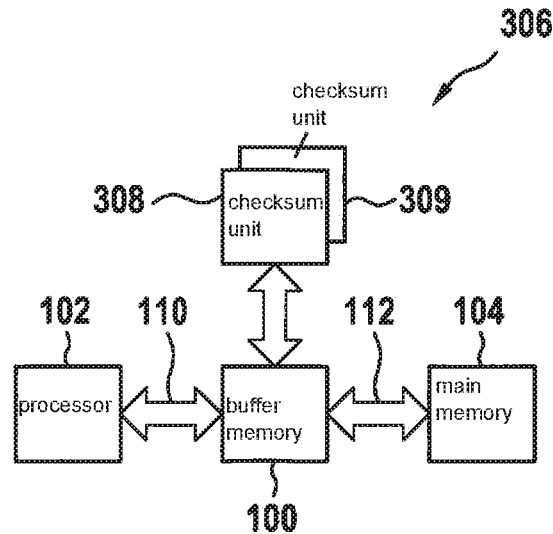
FIG. 3 shows a block diagram of a memory architecture according to one exemplary embodiment.

The start of the check sum calculation according to one exemplary embodiment is assumed to be that the calculation starts directly after the change of the cache line. If the cache line is changed again before its displacement, the already calculated main memory check sum is invalid and a recalculation must take place. In order to avoid unnecessary check sum calculations, the calculation of the main memory check sum is delayed according to one exemplary embodiment in the case of the LRU displacement strategy until the cache line in the order of its last use has achieved a particular value and the likelihood of displacement increases FIG. 3 shows a block diagram of a memory architecture according to one exemplary embodiment. The memory architecture includes buffer memory 100 in the form of a cache previously described with reference to FIG. 1, processor 102 in the form of a CPU and main memory 104. A device 306 for determining check sums for buffer memory 100 is also shown. According to different exemplary embodiments, device 306 includes one or multiple units, here, for example, two units 308, 309 for calculating the main memory check sum, which are also referred to as check sum units or check sum calculation units.

According to different exemplary embodiments, device 306 is designed as an external unit to buffer memory 100, or is implemented in an integrated manner in buffer memory 100, for example, on the same chip.

In the exemplary memory hierarchy shown, in which cache 100 is fitted according to the present invention with one or with multiple cache line check sum calculation units 308, 309, these units 308, 309 are designed in such a way that the main memory check sum may be calculated with the respectively valid time span $t_{cache\_only\_min}$. Two exemplary sequences for calculating check sums are shown below.

Figure 4:
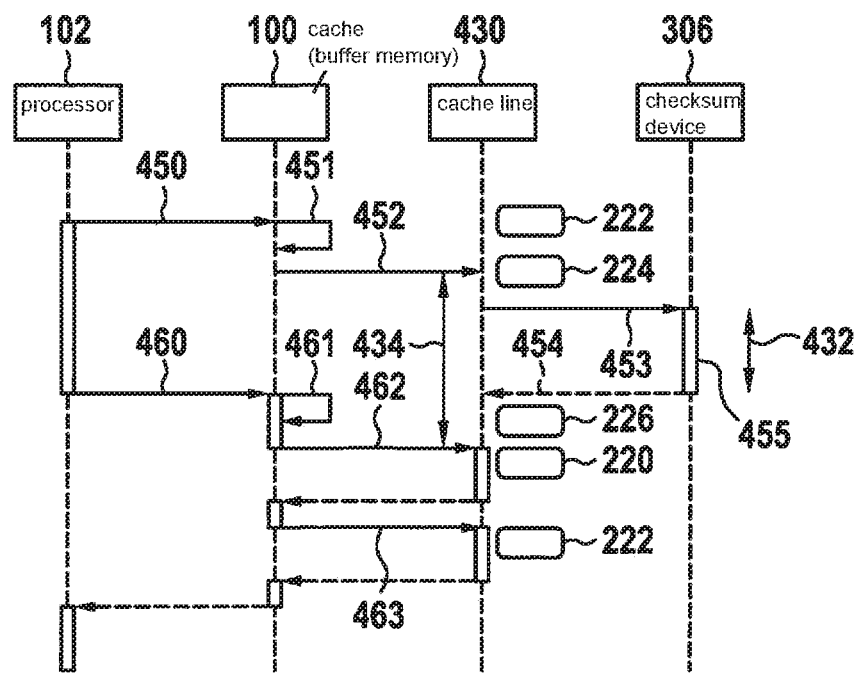
FIG. 4 shows a flow chart of a method for determining check sums according to one exemplary embodiment.

FIG. 4 shows a flow chart of a method for determining check sums according to one exemplary embodiment. An exemplary flow chart in this case is shown for a one-way cache 100 or a multi-way cache 100 with an MRU displacement strategy.

In addition to cache 100, CPU 102, a device 306 for determining check sums for cache 100 in the form of a check sum unit and a data unit 430 in the form of a cache line 430 are also depicted.

State 222 "unmodified", state 224 "modified_checksum_pending", state 226 "modified_checksum_valid" and state 220 "invalid" are shown with respect to cache line 430.

A time duration 432 $t_{checksum\_duration}$ for ascertaining the check sum is shorter in this case than time duration 434 $t_{cache\_only\_min\_MRU}$. Arrow 450 indicates the writing of data from CPU 102 into cache 100. This is a so-called cache hit 451 or hit. Arrow 452 indicates the change of cache line 430 caused by cache hit 451.

Arrow 453 indicates the impetus of the check sum calculation by device 306. After the check sum is ascertained, cache line 430 is marked as changed with a valid check sum as a result of state 226, which is indicated by arrow 454.

According to one exemplary embodiment, arrow 453 indicates the reading in of cache line 430 changed by the access of processor 102 indicated by arrow 450. The ascertainment of the check sum for cache line 430 marked as changed is represented by bar 455. Arrow 454 indicates the supplementing of cache line 430 marked as changed with the ascertained check sum as well as the marking of cache line 430 as changed with a valid check sum.

Arrow 460 shown in FIG. 4 indicates the reading or writing of data. This is a so-called cache miss 461. Arrow 462 indicates the writing back of data and arrow 463 indicates the loading of a new cache line 430.

Thus, FIG. 4 shows an exemplary flow chart for calculating the main memory check sum within time period 434 $t_{cache\_only\_min\_MRU}$ in the case of a one-way cache 100 or of a multi-way cache 100 using an MRU displacement strategy. Cache line 430 is initially in the state unmodified. This state switches to state 224 "modified_checksum_pending" as a result of a writing access of CPU 102 to this cache line 430 and the calculation of the main memory check sum is started. In terms of a recoding, the data word-related check sums are evaluated as part of the calculation of the main memory check sum and an error is signaled in the event of a deviation. The completion of the calculation of the main memory check sum and the associated transition of state 224 to state 226 "modified_checksum_valid" takes place before the lapse of time span $t_{cache\_only\_min\_MRU}$, as a result of which a subsequent displacement of cache line 430 is able to take place without delay.

Figure 5:
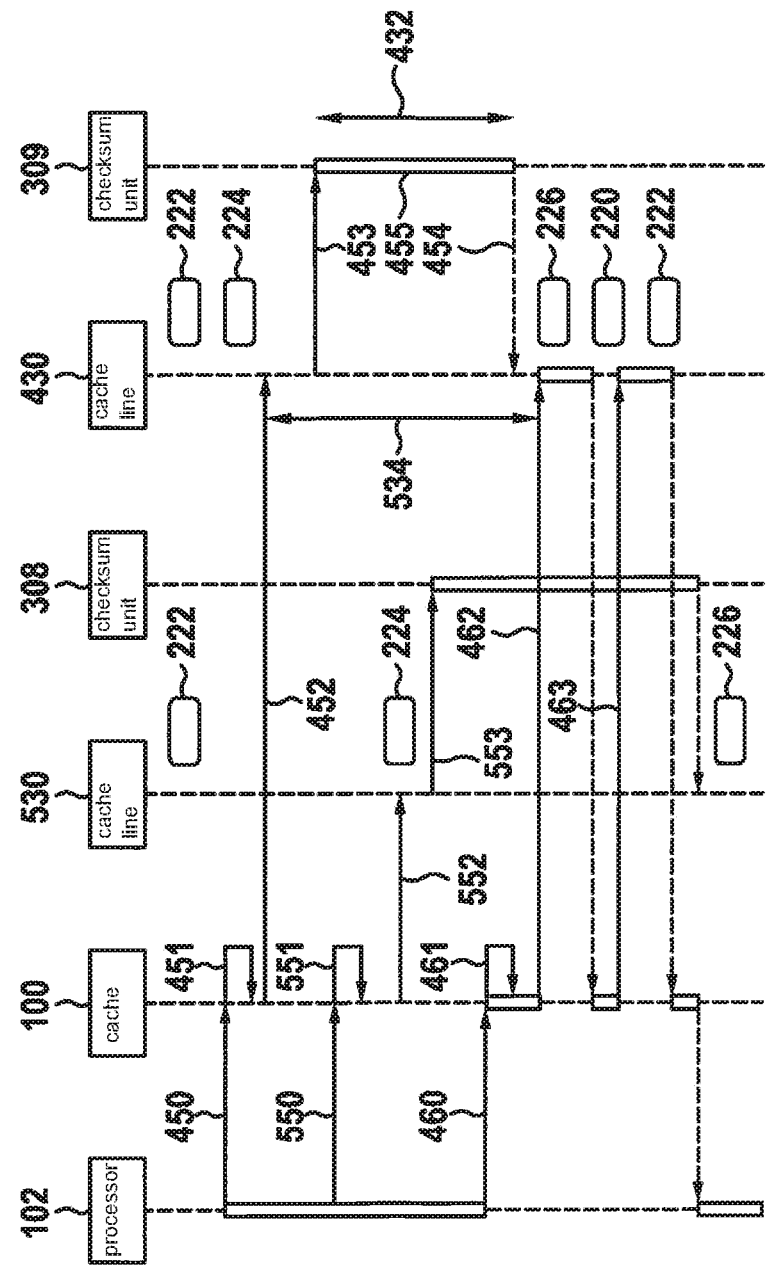
FIG. 5 shows a flow chart of a method for determining check sums according to one exemplary embodiment.

FIG. 5 shows a flow chart of a method for determining check sums according to one exemplary embodiment. An exemplary flow chart is shown for calculating the main memory check sums of two cache lines 430, 530 in the case of a two-way cache 100 using an LRU displacement strategy. The two cache lines 430, 530 are initially in state 222 "unmodified". Both cache lines 430, 530 are modified sequentially by CPU 102. Because cache 100 is made up of two paths and LRU is used as a displacement strategy, the second modification may not result in the displacement of first cache line 530. Accordingly, a longer time span $t_{cache\_only\_min\_LRU}$ is available for the calculation of the respective main memory check sum.

The flow chart corresponds to the diagram described with reference to FIG. 4, with the difference that two cache lines 430, 530 are shown. The device for determining check sums for cache 100 now includes a first check sum unit 308, which is assigned to first cache line 530 and a second check sum unit 309, which is assigned to second cache line 430.

Corresponding to arrows 450, 451, 452, 453, 460, 461, 462, 463 previously described with reference to FIG. 4, which relate to second cache line 430, FIG. 5 shows an arrow 550, which indicates a further writing of data by CPU 102 into cache 100. This is again a cache hit 551. Arrow 552 indicates the change of first cache line 530 caused by cache hit 551. Arrow 553 indicates the impetus of the check sum calculation by check sum unit 308. After the check sum is ascertained, first cache line 530 is marked as a result of state 226 as changed with a valid check sum.

According to one exemplary embodiment, arrow 553 indicates the reading in of the changed additional cache line 530 by the access of processor 102 indicated by arrow 550. Bar 555 represents the ascertainment of the additional check sum for cache line 530 marked as changed.

Figure 6:
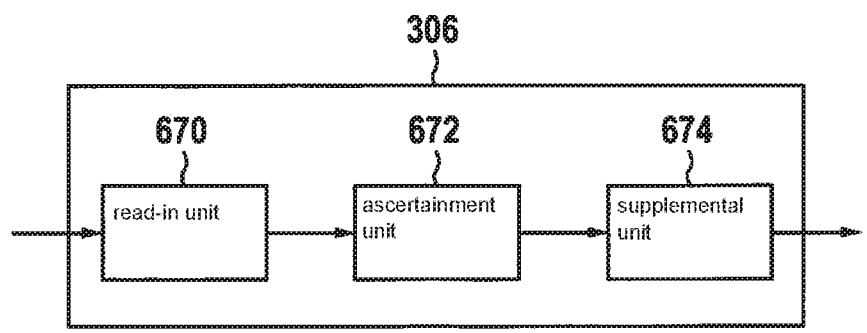
FIG. 6 schematically shows a representation of a device for determining check sums according to one exemplary embodiment.

FIG. 6 schematically shows a representation of a device 306 for determining check sums according to one exemplary embodiment. This may be a device 306, as it is described above. Device 306 may include one or multiple check sum unit(s), one check sum unit being provided in the exemplary embodiment shown in FIG. 6.

Device 306 includes a read-in unit 670, which is designed to read in a data unit of the buffer memory marked as changed by an access of the processor. This may be a cache line in the state "modified_checksum_pending". Device 306 further includes an ascertainment unit 672, which is designed to ascertain a check sum for the data unit read in by read-in unit 670, as well as a supplemental unit 674, which is designed to supplement the data unit with the check sum and to mark the data unit as changed with a valid check sum.

According to one exemplary embodiment, read-in unit 670 is designed to read in the cache line via an internal interface of the buffer memory and supplemental unit 674 is designed to output the check sum via the internal interface or an additional internal interface of the buffer memory.

The main memory check sum determined by device 306 may be checked during the loading of a cache line for detecting any errors in the memory by the same check sum calculation units, i.e., units of device 306. The sequence of the check may, however, differ as a function of the capabilities of the CPU, of the cache and of the requirements with respect to functional safety of the entire system.

If the cache has a prefetcher, which is able to speculatively (advance) load the data, the plausibility check of the main memory check sum and, if necessary, the correction of correctable errors may already take place before the data are retrieved from the cache by the CPU. In this case, the evaluation of the main memory check sum does not impact the system performance negatively.

If no prefetcher is present, but instead the data are first loaded only when they are actually needed by the CPU, there are two options for the sequence of the plausibility check.

If the CPU has the capability of cancelling speculatively executed instructions, then the main memory check sum may be asynchronously evaluated. This means that the data are forwarded to the CPU before the evaluation of the main memory check sum in order not to influence the system performance. If a correctable error is determined in conjunction with the evaluation, the instructions affected by the not yet corrected data are rejected and are repeated using the corrected data. If an uncorrectable error is determined during the evaluation, the system is switched off.

If the CPU does not have the capacity to cancel speculatively executed instructions and switching off the entire system in the case of a delayed error correction is not possible, the check sum must then be synchronously evaluated.

If an error detection and a switch-off of the system within a maximum time, for example, an error tolerance time, is sufficient, the evaluation of the main memory check sum during the loading of a cache row may be dispensed with and, instead, the (safety-relevant) memory contents may be cyclically checked for plausibility by a separate unit.

If an exemplary embodiment includes an "and/or" linkage between a first feature and a second feature, this is to be read in the sense that the exemplary embodiment according to one specific embodiment includes both the first feature and the second feature, and according to another specific embodiment, either only the first feature or only the second feature.

What is claimed is:

1. A method for a data unit of a cache memory that is marked as changed by an access of a processor, the method comprising the following steps:
   providing a check sum for the data unit responsive to passage, from a time when the data unit of the cache memory was marked as changed by the access of the processor, of a predetermined amount of time or a predetermined number of accesses of the cache memory subsequent to the access by which the data unit was marked as changed;
   wherein:
   the providing of the check sum includes:
       ascertaining the check sum for the data unit using a check sum unit of the cache memory;
       supplementing the data unit with the check sum; and
       marking the data unit as changed with a valid check sum; and
   the providing of the check sum is performed without occurrence of any event requiring a write of the data word from the cache memory to a data storage device other than the cache memory and without occurrence of any event requiring an overwrite of the data word in the cache memory.

2. The method as recited in claim 1, wherein the providing of the check sum is performed responsive to the passage of the predetermined amount of time, and the predetermined amount of time is a time span which is minimally between the access of the processor and a writing back of the data unit into a main memory.

3. The method as recited in claim 2, wherein at least two performances of the ascertaining and supplementing are carried out within the time span.

4. The method as recited in claim 1, further comprising the following steps:
   reading in an additional data unit of the cache memory marked as changed by an additional access of the processor;
   ascertaining an additional check sum for the additional data unit using an additional check sum unit of the cache memory; and
   supplementing the additional data unit with the check sum and marking the additional data unit as changed with a valid check sum.

5. The method as recited in claim 1, wherein:
   the providing of the check sum is performed responsive to the passage of the predetermined number of accesses; and
   the method further comprises counting a number of accesses of the processor to the data unit to determine whether the predetermined number of accesses has occurred.

6. The method as recited in claim 1, wherein the data unit is a cache memory row.

7. The method as recited in claim 1, further comprising the following step:
   loading the data unit and using the check sum of the data unit for checking integrity of the data unit using the check sum unit.

8. The method as recited in claim 1, wherein the providing of the check sum is performed responsive to the passage of the predetermined number of accesses.

9. The method as recited in claim 1, wherein the providing of the check sum is performed responsive to the passage of the predetermined amount of time.

10. The method as recited in claim 9, wherein the predetermined amount of time is a time required for passage of a predetermined number of a plurality of clock cycles.

11. The method as recited in claim 10, wherein the predetermined number is a multiple, greater than one, of a number of clock cycles required for a single access of the cache memory.

12. A device comprising:
an ascertainment unit, and
a supplemental unit
wherein:
for a data unit of a cache memory that is marked as changed by an access of a processor, the device is configured to provide a check sum for the data unit responsive to passage, from a time when the data unit of the cache memory was marked as changes by the access of the processor, of a predetermined amount of time or a predetermined number of accesses of the cache memory subsequent to the access by which the data unit was marked as changed;
the provision of the check sum includes:
the ascertainment unit ascertaining the check sum for the data unit; and
a supplemental unit supplementing the data unit with the check sum and marking the data unit as changed with a valid check sum; and
the device is configured to perform the provision of the check sum without occurrence of any event requiring a write of the data word from the cache memory to a data storage device other than the cache memory and without occurrence of any event requiring an overwrite of the data word in the cache memory.

13. A cache memory for a processor, the cache memory including a device, the device comprising:
an ascertainment unit; and
a supplemental unit;
wherein:
for a data unit of the cache memory that is marked as changed by an access of the processor, the device is configured to provide a check sum for the data unit responsive to passage, from a time when the data unit of the cache memory was marked as changes by the access of the processor, of a predetermined amount of time or a predetermined number of accesses of the cache memory subsequent to the access by which the data unit was marked as changed;
the provision of the check sum includes:
the ascertainment unit ascertaining the check sum for the data unit; and
a supplemental unit supplementing the data unit with the check sum and marking the data unit as changed with a valid check sum; and
the device is configured to perform the provision of the check sum without occurrence of any event requiring a write of the data word from the cache memory to a data storage device other than the cache memory and without occurrence of any event requiring an overwrite of the data word in the cache memory.

14. The cache memory as recited in claim 13, wherein the cache memory is an integrated circuit that includes the device.

15. The cache memory as recited in claim 13, further comprising:
a processor interface configured to enable the access of the processor to the data unit of the cache memory; and
a main memory interface for loading the data unit from, and/or writing back the data unit into, a main memory.

16. A processor including a cache memory, the cache memory including a device, the device comprising:
an ascertainment unit; and
a supplemental unit;
wherein:
for a data unit of the cache memory that is marked as changed by an access of the processor, the device is configured to provide a check sum for the data unit responsive to passage, from a time when the data unit of the cache memory was marked as changes by the access of the processor, of a predetermined amount of time or a predetermined number of accesses of the cache memory subsequent to the access by which the data unit was marked as changed;
the provision of the check sum includes:
the ascertainment unit ascertaining the check sum for the data unit; and
a supplemental unit supplementing the data unit with the check sum and marking the data unit as changed with a valid check sum; and
the device is configured to perform the provision of the check sum without occurrence of any event requiring a write of the data word from the cache memory to a data storage device other than the cache memory and without occurrence of any event requiring an overwrite of the data word in the cache memory.

17. A non-transitory machine-readable memory medium on which is stored a computer program that is executable by a computer and that, when executed by computer, causes the computer to perform a method for a data unit of a cache memory that is marked as changed by an access of a processor, the method comprising the following steps:
providing a check sum for the data unit responsive to passage, from a time when the data unit of the cache memory was marked as changed by the access of the processor, of a predetermined amount of time or a predetermined number of accesses of the cache memory subsequent to the access by which the data unit was marked as changed;
wherein:
the providing of the check sum includes:
ascertaining the check sum for the data unit using a check sum unit of the cache memory;
supplementing the data unit with the check sum; and
marking the data unit as changed with a valid check sum; and
the providing of the check sum is performed without occurrence of any event requiring a write of the data word from the cache memory to a data storage device other than the cache memory and without occurrence of any event requiring an overwrite of the data word in the cache memory.

* * * * *